(12) United States Patent
Guo

(10) Patent No.: US 12,557,952 B2
(45) Date of Patent: Feb. 24, 2026

(54) ASYMMETRIC WHEEL FOR MOBILE CLEANING ROBOT

(71) Applicant: iRobot Corporation, Bedford, MA (US)

(72) Inventor: Fangzheng Guo, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 541 days.

(21) Appl. No.: 17/967,235

(22) Filed: Oct. 17, 2022

(65) Prior Publication Data

US 2024/0122423 A1 Apr. 18, 2024

(51) Int. Cl.
| | |
|---|---|
| *A47L 11/40* | (2006.01) |
| *A47L 9/00* | (2006.01) |
| *B60C 7/00* | (2006.01) |
| *B60C 11/00* | (2006.01) |
| *B60C 11/02* | (2006.01) |
| *B60C 11/03* | (2006.01) |

(52) U.S. Cl.
CPC .............. *A47L 9/009* (2013.01); *B60C 7/00* (2013.01); *B60C 11/0083* (2013.01); *B60C 11/02* (2013.01); *B60C 11/0304* (2013.01); *A47L 2201/00* (2013.01); *B60C 2011/0367* (2013.01)

(58) Field of Classification Search
CPC ....... B60C 11/0304; B60C 11/02; B60C 7/00; B60C 2011/0367; A47L 9/009; A47L 2201/00
See application file for complete search history.

(56) References Cited

U.S. PATENT DOCUMENTS

| | | | | |
|---|---|---|---|---|
| 1,478,156 A | * | 12/1923 | Whitcomb .............. | B60C 11/02 |
| | | | | 152/902 |
| 2,534,869 A | * | 12/1950 | Jones .................. | B60C 11/0306 |
| | | | | 152/209.8 |
| 3,014,547 A | * | 12/1961 | Van Der Lely ..... | B60B 35/1054 |
| | | | | 301/43 |
| D400,133 S | * | 10/1998 | Johenning .................... | D12/555 |

(Continued)

FOREIGN PATENT DOCUMENTS

| | | |
|---|---|---|
| CN | 103654643 | 3/2014 |
| CN | 212755498 | 3/2021 |

(Continued)

OTHER PUBLICATIONS

Machine translation for German 212020000239 (Year: 2025).*

(Continued)

*Primary Examiner* — Steven D Maki
(74) *Attorney, Agent, or Firm* — Schwegman Lundberg & Woessner, P.A.

(57) ABSTRACT

An autonomous mobile cleaning robot can include a cleaning assembly and a drive wheel. The cleaning assembly can be configured to lift debris from a surface and direct the debris into a dustpan. The drive wheel can be configured to move the autonomous mobile cleaning robot on the surface. The drive wheel can include a first set of treads configured to climb an obstacle, a second set of treads configured to maintain continuous contact with a surface of a floor, and third set of treads configured to direct water underneath the third set of treads towards a center of the autonomous mobile cleaning robot.

10 Claims, 10 Drawing Sheets

(56)                   References Cited

U.S. PATENT DOCUMENTS

| | | | | |
|---|---|---|---|---|
| 8,670,866 | B2 | 3/2014 | Ziegler et al. | |
| 11,027,580 | B2 | 6/2021 | Grace et al. | |
| 2016/0152092 | A1 * | 6/2016 | Sasaki ................. | B60C 11/0304 |
| | | | | 152/209.1 |
| 2019/0210409 | A1 * | 7/2019 | Grace ..................... | A47L 11/28 |
| 2020/0383547 | A1 * | 12/2020 | Sutter ................. | A47L 11/4013 |

FOREIGN PATENT DOCUMENTS

| | | | | | |
|---|---|---|---|---|---|
| DE | 212020000239 | U1 * | 12/2020 | .......... | A47L 11/4072 |
| EP | 367557 | B1 * | 1/1994 | | |
| JP | 03-231005 | A * | 10/1991 | | |
| JP | 2010-254092 | A * | 11/2010 | | |
| JP | 2011-255685 | A * | 12/2011 | | |
| JP | 2022535266 | | 8/2022 | | |
| KR | 2001-0001506 | A * | 1/2001 | | |

OTHER PUBLICATIONS

Machine translation for Japan 03-231005 (Year: 2025).*
Machine translation for Japan 2010-254092 (Year: 2025).*
Machine translation for Japan 2011-255685 (Year: 2025).*
Machine translation for Korea 2001-0001506 (Year: 2025).*
"International Application Serial No. PCT US2023 035188, International Search Report mailed Feb. 6, 2024", 4 pgs.
"International Application Serial No. PCT US2023 035188, Written Opinion mailed Feb. 6, 2024", 7 pgs.
"European Application Serial No. 23804829.2, Response to Communication pursuant to Rules 161(2) and 162 EPC filed Nov. 14, 2025", w/ claims, 6 pgs.

* cited by examiner

ASYMMETRIC WHEEL FOR MOBILE CLEANING ROBOT

TECHNICAL FIELD

Embodiments described herein generally relate to a wheel for a mobile cleaning robot and, more specifically, to an asymmetric wheel for mobile cleaning robot.

BACKGROUND

Autonomous mobile robots can move about an environment and can perform functions and operations in a variety of categories, including but not limited to security operations, infrastructure or maintenance operations, navigation or mapping operations, inventory management operations, and robot/human interaction operations. Some mobile robots, known as cleaning robots, can perform cleaning tasks autonomously within an environment, e.g., a home. Many kinds of cleaning robots are autonomous to some degree and in different ways. For example, some mobile cleaning robots can perform both vacuuming and mopping operations or routines.

SUMMARY

A mobile cleaning robot can be an autonomous robot that can navigate an environment to complete various cleaning activities. The environment can include various surfaces (e.g., carpet, tile, wood, or the like), various forms of debris (e.g., liquid, dirt, hair, or the like), and various obstacles (e.g., floor transitions, cords, furniture, objects, or the like). Therefore, mobile cleaning robots can struggle to navigate environments having various surfaces, debris, and obstacles.

The devices, systems, or methods of this application can help to address this issue by including a multi-tread drive wheel. For example, a first tread section including a first tread type can be configured to help the mobile cleaning robot climb over obstacles, a second tread type can help the mobile cleaning robot maintain traction and reduce noise or operation, and a third tread type can help move water form under the tire toward a center of the robot to improve traction of the mobile cleaning robot in wet environments.

In one example, a drive wheel for a mobile cleaning robot can extend circumferentially around a central axis. The drive wheel can include a first wall laterally spaced from a second wall. A tread base can extend between the first wall and the second wall. A first tread section can be adjacent to the first wall. The first tread section can include climbing treads. The climbing treads can extend laterally from the first wall towards the second wall. The climbing treads can also extend radially from the tread base. Each climbing tread of the climbing treads can be circumferentially spaced from each adjacent climbing tread. A second tread section can extend from the first tread section toward the second wall. The second tread section can include continuous treads that can extend circumferentially continuously around the drive wheel and can extend radially from the tread base. Each continuous tread of the continuous treads can be laterally spaced from each adjacent continuous tread. A third tread section can extend between the second tread section and the second wall. The third tread section can include curved treads that can extend laterally and arcuately from a first edge adjacent to the second tread section to a second edge adjacent to the second wall. The curved treads can extend radially from the tread base.

In another example, a drive wheel for a mobile cleaning robot can extend circumferentially around a central axis. The drive wheel can include a first wall laterally spaced from a second wall. A tread base can extend between the first wall and the second wall. A first treaded surface can be formed on the tread base. The first treaded surface can include multiple tread sets. A second treaded surface can be formed on the tread base opposite the first treaded surface. The second treaded surface can extend from the first wall to the second wall. The second treaded surface can be radially spaced from the first treaded surface. The second treaded surface can include a single tread set. The single tread set can be optimized to increase capabilities of the mobile cleaning robot in an environment.

In yet another example, an autonomous mobile cleaning robot can include a cleaning assembly and a drive wheel. The cleaning assembly can be configured to lift debris from a surface and direct the debris into a dustpan. The drive wheel can be configured to move the autonomous mobile cleaning robot on the surface. The drive wheel can include a first set of treads configured to climb an obstacle, a second set of treads configured to maintain continuous contact with a surface of a floor, and third set of treads configured to direct water underneath the third set of treads towards a center of the autonomous mobile cleaning robot.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
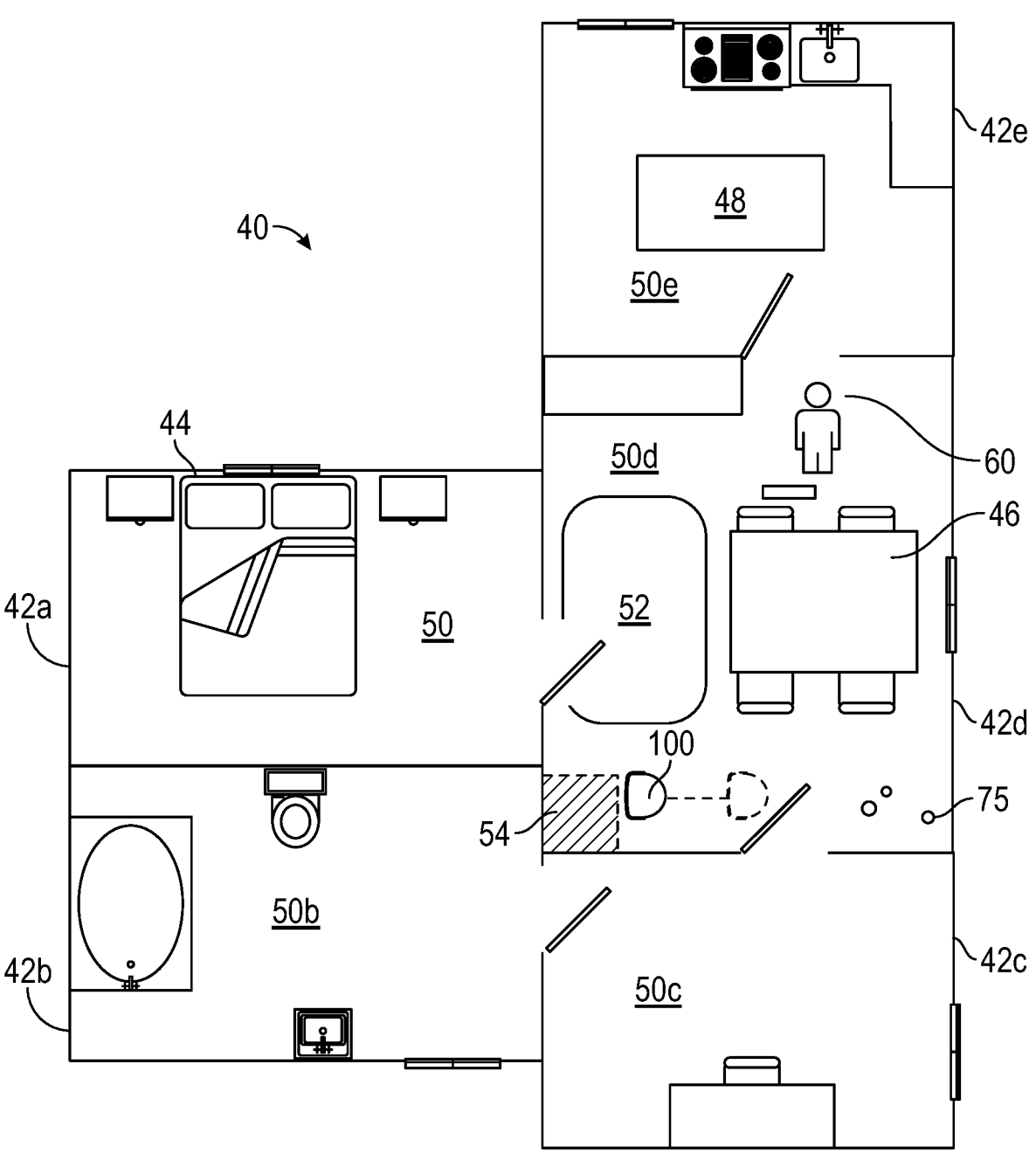
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d (which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot 100 or another device. The robot 100 can update the map (or data related thereto) such as to include or account for surface types of the floor surfaces 50a-50e of each of the respective rooms 42 of the environment 40. In some examples, the map can be updated to show the different surface types such as within each of the rooms 42.

In some examples, the user 60 can define a behavior control zone 54. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Figure 2A:
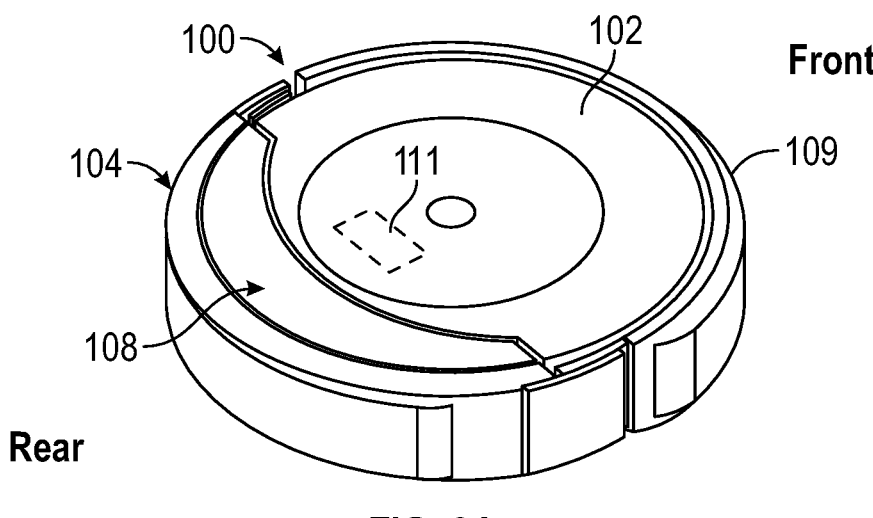
FIG. 2A illustrates an isometric view of a mobile cleaning robot in a first condition.
Figure 2B:
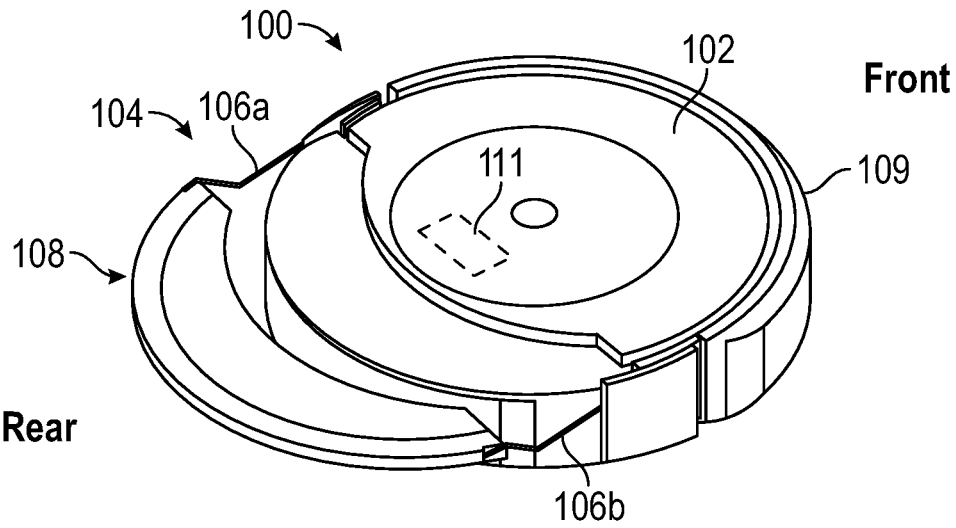
FIG. 2B illustrates an isometric view of a mobile cleaning robot in a second condition.
Figure 2C:
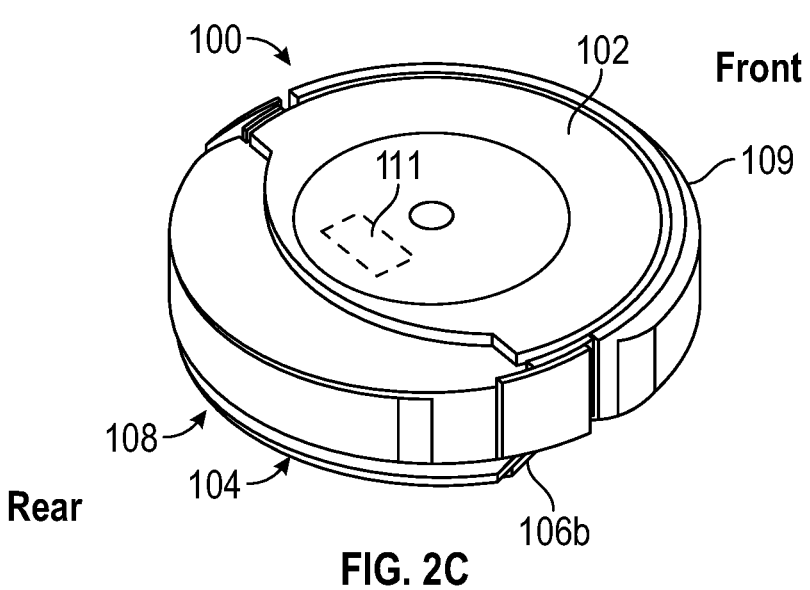
FIG. 2C illustrates an isometric view of a mobile cleaning robot in a third condition.

FIGS. 2A-2C are discussed together below. FIG. 2A illustrates an isometric view of a mobile cleaning robot 100 with a pad assembly in a stored position. FIG. 2B illustrates an isometric view of the mobile cleaning robot 100 with the pad assembly in an extended position. FIG. 2C illustrates an isometric view of the mobile cleaning robot 100 with the pad assembly in a mopping position. FIGS. 2A-2C also show orientation indicators Front and Rear.

The mobile cleaning robot 100 can include a body 102 and a mopping system 104. The mopping system 104 can include arms 106a and 106b (referred to together as arms 106) and a pad assembly 108. The robot 100 can also include a bumper 109 and other features such as an extractor (including rollers), one or more side brushes, a vacuum system, a controller, a drive system (e.g., motor, geartrain, and wheels), a caster, and sensors, as discussed in further detail below. A distal portion of the arms 106 can be connected to the pad assembly 108 and a proximal portion of the arms 106a and 106b can be connected to an internal drive system to drive the arms 106 to move the pad assembly 108.

Figure 2D:
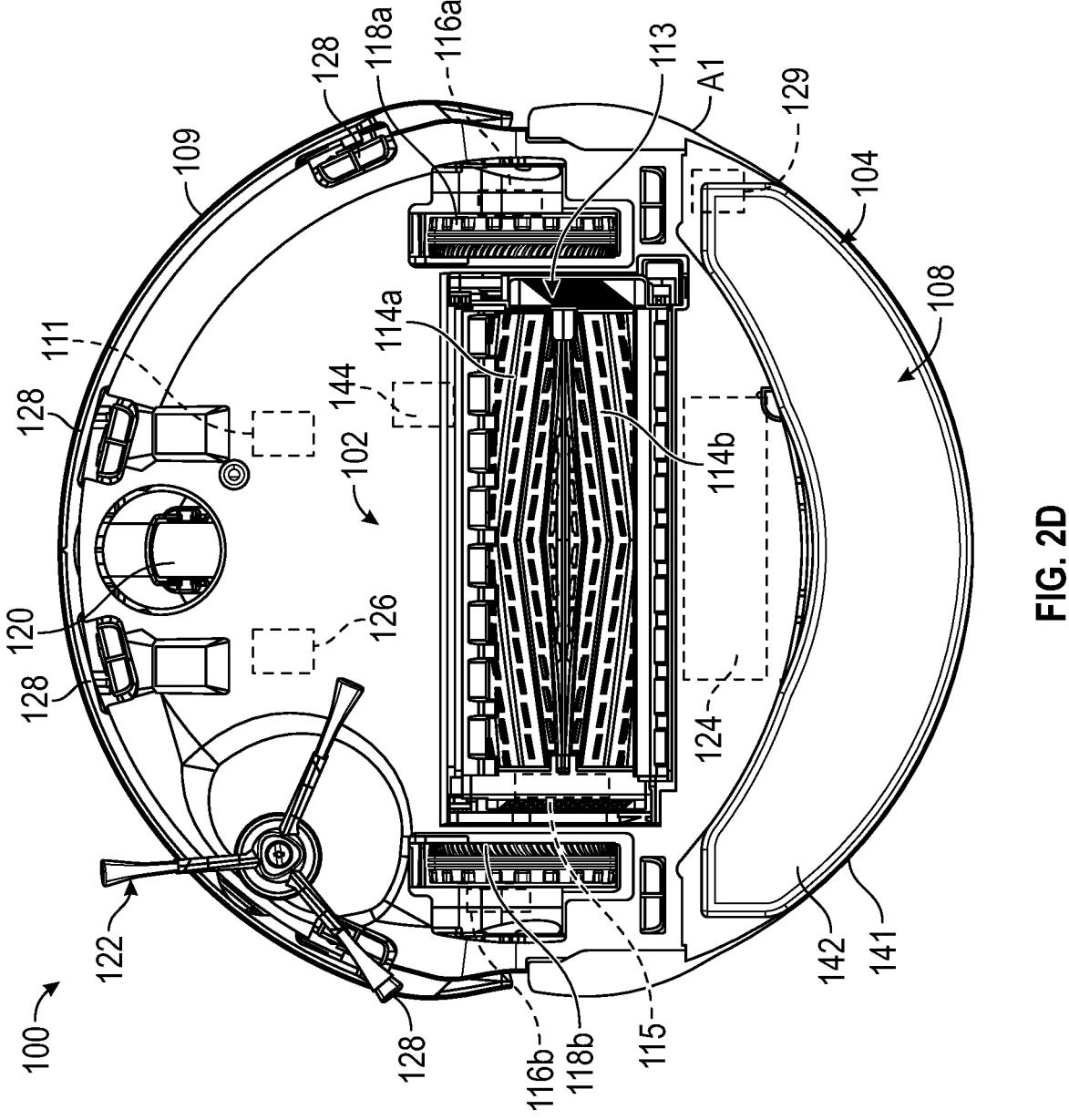
FIG. 2D illustrates a bottom view of a mobile cleaning robot in a third condition.
Figure 2E:
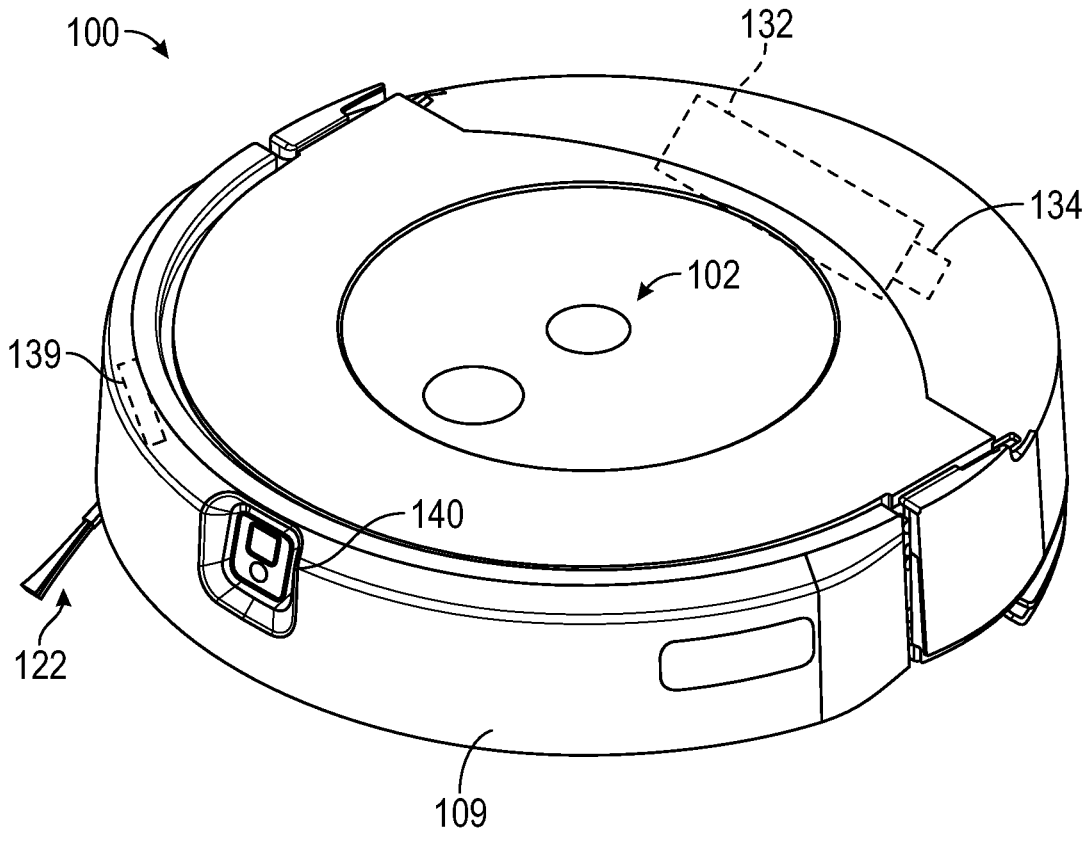
FIG. 2E illustrates a top isometric view of a mobile cleaning robot in a third condition.

FIGS. 2A-2C show how the robot 100 can be operated to move the pad assembly 108 from a stored position in FIG. 2A to a transition or partially deployed position in FIG. 2B, to a mopping or a deployed position in FIG. 2C. In the stored position of FIG. 2A, the robot 100 can perform only vacuuming operations. In the deployed position of FIG. 2C, the robot 100 can perform vacuuming operations or mopping operations. FIGS. 2D-2E discuss additional components of the robot 100.

FIG. 2D illustrates a bottom view of the mobile cleaning robot 100 and FIG. 2E illustrates a top isometric view of the robot 100. FIGS. 2D and 2E are discussed together below. The robot 100 of FIGS. 2D and 2E can be consistent with FIGS. 2A-2C; FIGS. 2D-2E show additional details of the robot 100 For example, FIGS. 2D-2E show that the robot 100 can include a body 102, a bumper 109, an extractor 113 (including rollers 114a and 114b), motors 116a and 116b, drive wheels 118a and 118b, a caster 120, a side brush assembly 122, a vacuum assembly 124, memory 126, sensors 128, and a debris bin 130. The mopping system 104 can also include a tank 132 and a pump 134.

The cleaning robot 100 can be an autonomous cleaning robot that autonomously traverses the floor surface 50 (of FIG. 1) while ingesting the debris from different parts of the floor surface 50. As shown in FIG. 2D, the robot 100 can include the body 102 that can be movable across the floor surface 50. The body 102 can include multiple connected structures to which movable or fixed components of the cleaning robot 100 are mounted. The connected structures can include, for example, an outer housing to cover internal components of the cleaning robot 100, a chassis to which the drive wheels 118a and 118b and the cleaning rollers 114a and 114b (of the cleaning assembly 113) are mounted, and the bumper 109 connected to the outer housing. The caster wheel 120 can support the front portion of the body 102 above the floor surface 50, and the drive wheels 118a and 118b can support the middle and rear portions of the body 102 (and can also support a majority of the weight of the robot 100) above the floor surface 50.

As shown in FIG. 2D, the body 102 can include a front portion that can have a substantially semicircular shape and that can be connected to the bumper 109. The body 102 can also include a rear portion that has a substantially semicircular shape. In other examples, the body 102 can have other shapes such as a square front or straight front. The robot 100 can also include a drive system including the actuators (e.g., motors) 116a and 116b. The actuators 116a and 116b can be connected to the body 102 and can be operably connected to the drive wheels 118a and 118b, which can be rotatably mounted to the body 102. The actuators 116a and 116b, when driven, can rotate the drive wheels 118a and 118b to enable the robot 100 to autonomously move across the floor surface 50.

The vacuum assembly 124 can be located at least partially within the body 102 of the robot 100, such as in a rear portion of the body 102, and can be located in other locations in other examples. The vacuum assembly 124 can include a motor to drive an impeller that generates the airflow when rotated. The airflow and the cleaning rollers 114, when rotated, can cooperate to ingest the debris into the robot 100. The cleaning bin 130 can be mounted in the body 102 and can contain the debris ingested by the robot 100. A filter in the body 102 can separate the debris from the airflow before the airflow enters the vacuum assembly 124 and is exhausted out of the body 102. In this regard, the debris can be captured in both the cleaning bin 130 and the filter before the airflow is exhausted from the body 102. In some examples, the vacuum assembly 124 and extractor 113 can be optionally included or can be of a different type. Optionally, the vacuum assembly 124 can be operated during mopping operations, such as those including the mopping system 104. That is, the robot 100 can perform simultaneous vacuuming and mopping missions or operations.

The cleaning rollers 114a and 114b can be operably connected to an actuator 115, e.g., a motor, through a gearbox. The cleaning head 113 and the cleaning rollers 114a and 114b can be positioned forward of the cleaning bin 130. The cleaning rollers 114 can be mounted to an underside of the body 102 so that the cleaning rollers 114a and 114b engage debris on the floor surface 50 during the cleaning operation when the underside of the body 102 faces the floor surface 50. FIG. 2D further shows that the pad assembly 108 can include a brake 129 that can be configured to engage a portion of the pad assembly 108 to limit movement or motion of a mopping pad 142 (and a pad tray 141 to which the mopping pad 142 is connected) with respect to the body 102. In examples, the mopping pad 142 can support rear portions of the body 102 when the mobile cleaning robot 100 is in mopping mode. The cleaning bin 130 can also sit on top of the mopping pad 142.

The controller 111 can be located within the housing 102 and can be a programable controller, such as a single or multi-board computer, a direct digital controller (DDC), a programable logic controller (PLC), or the like. In other examples, the controller 111 can be any computing device, such as a handheld computer, for example, a smart phone, a tablet, a laptop, a desktop computer, or any other computing device including a processor, memory, and communication capabilities. The memory 126 can be one or more types of memory, such as volatile or non-volatile memory, read-only memory (ROM), random-access memory (RAM), magnetic disk storage media, optical storage media, flash-memory devices, and other storage devices and media. The memory 126 can be located within the housing 102, connected to the controller 111 and accessible by the controller 111.

The controller 111 can operate the actuators 116a and 116b to autonomously navigate the robot 100 about the floor surface 50 during a cleaning operation. The actuators 116a and 116b can be operable to drive the robot 100 in a forward drive direction, in a backwards direction, and to turn the robot 100. The controller 111 can operate the vacuum assembly 124 to generate an airflow that flows through an air gap near the cleaning rollers 114, through the body 102, and out of the body 102.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50. The sensors 128 (shown in FIG. 2D) can be located along a bottom portion of the housing 102. Each of the sensors 128 can be an optical sensor that can be configured to detect a presence or absence of an object below the optical sensor, such as the floor surface 50. The sensors 128 (optionally cliff sensors) can be connected to the controller 111 and can be used by the controller 111 to navigate the robot 100 within the environment 40. In some examples, the cliff sensors can be used to detect a floor surface type which the controller 111 can use to selectively operate the mopping system 104.

The cleaning pad assembly 108 can be a cleaning pad connected to the bottom portion of the body 102 (or connected to a moving mechanism configured to move the assembly 108 between a stored position and a cleaning position), such as to the cleaning bin 130 in a location to the rear of the extractor 113. The tank 132 can be a water tank configured to store water or fluid, such as cleaning fluid, for delivery to a mopping pad 142. The pump 134 can be connected to the controller 111 and can be in fluid communication with the tank 132. The controller 111 can be configured to operate the pump 134 to deliver fluid to the mopping pad 142 during mopping operations. The controller 111 can also be configured to operate the pump 134 to deliver fluid around the mopping pad 142 during mopping operations. In some examples, the pad 142 can be a dry pad such as for dusting or dry debris removal. The pad 142 can also be any cloth, fabric, or the like configured for cleaning (either wet or dry) of a floor surface.

In operation of some examples, the controller 111 can be used to instruct the robot 100 to perform a mission. In such a case, the controller 111 can operate the motors 116 to drive the drive wheels 118 and propel the robot 100 along the floor surface 50. The robot 100 can be propelled in a forward drive direction or a rearward drive direction. The robot 100 can also be propelled such that the robot 100 turns in place or turns while moving in the forward drive direction or the rearward drive direction. In addition, the controller 111 can operate the motors 115 to cause the rollers 114a and 114b to rotate, can operate the side brush assembly 122, and can operate the motor of the vacuum system 124 to generate airflow. The controller 111 can execute software stored on the memory 126 to cause the robot 100 to perform various navigational and cleaning behaviors by operating the various motors of the robot 100.

The various sensors of the robot 100 can be used to help the robot navigate and clean within the environment 40. For example, the cliff sensors can detect obstacles such as drop-offs and cliffs below portions of the robot 100 where the cliff sensors are disposed. The cliff sensors can transmit signals to the controller 111 so that the controller 111 can redirect the robot 100 based on signals from the sensors.

Proximity sensors can produce a signal based on a presence or the absence of an object in front of the optical sensor. For example, detectable objects include obstacles such as furniture, walls, persons, and other objects in the environment 40 of the robot 100. The proximity sensors can transmit signals to the controller 111 so that the controller 111 can redirect the robot 100 based on signals from the proximity sensors. In some examples, a bump sensor can be used to detect movement of the bumper 109 along a fore-aft axis of the robot 100. A bump sensor 139 can also be used to detect movement of the bumper 109 along one or more sides of the robot 100 and can optionally detect vertical bumper movement. The bump sensors 139 can transmit signals to the controller 111 so that the controller 111 can redirect the robot 100 based on signals from the bump sensors 139.

The robot 100 can also optionally include one or more dirt sensors 144 connected to the body 102 and in communication with the controller 111. The dirt sensors 144 can be a microphone, piezoelectric sensor, optical sensor, or the like located in or near a flowpath of debris, such as near an opening of the cleaning rollers 114 or in one or more ducts within the body 102. This can allow the dirt sensor(s) 144 to detect how much dirt is being ingested by the vacuum assembly 124 (e.g., via the extractor 113) at any time during a cleaning mission. Because the robot 100 can be aware of its location, the robot 100 can keep a log or record of which areas or rooms of the map are dirtier or where more dirt is collected. This information can be used in several ways, as discussed further below.

The image capture device 140 can be configured to generate a signal based on imagery of the environment 40 of the robot 100 as the robot 100 moves about the floor surface 50. The image capture device 140 can transmit such a signal to the controller 111. The controller 111 can use the signal or signals from the image capture device 140 for various tasks, algorithms, or the like, as discussed in further detail below.

In some examples, the obstacle following sensors can detect detectable objects, including obstacles such as furniture, walls, persons, and other objects in the environment of the robot 100. In some implementations, the sensor system can include an obstacle following sensor along the side surface, and the obstacle following sensor can detect the presence or the absence an object adjacent to the side surface. The one or more obstacle following sensors can also serve as obstacle detection sensors, similar to the proximity sensors described herein.

The robot 100 can also include sensors for tracking a distance travelled by the robot 100. For example, the sensor system can include encoders associated with the motors 116 for the drive wheels 118, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 111 can use data collected by the sensors of the sensor system to control navigational behaviors of the robot 100 during the mission. For example, the controller 111 can use the sensor data collected by obstacle detection sensors of the robot 100, (the cliff sensors, the proximity sensors, and the bump sensors) to enable the robot 100 to avoid obstacles within the environment of the robot 100 during the mission.

The sensor data can also be used by the controller 111 for simultaneous localization and mapping (SLAM) techniques in which the controller 111 extracts features of the environment represented by the sensor data and constructs a map of the floor surface 50 of the environment. The sensor data collected by the image capture device 140 can be used for techniques such as vision-based SLAM (VSLAM) in which the controller 111 extracts visual features corresponding to objects in the environment 40 and constructs the map using these visual features. As the controller 111 directs the robot 100 about the floor surface 50 during the mission, the controller 111 can use SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles can be indicated on the map as nontraversable space, and locations of open floor space can be indicated on the map as traversable space.

The sensor data collected by any of the sensors can be stored in the memory 126. In addition, other data generated for the SLAM techniques, including mapping data forming the map, can be stored in the memory 126. These data produced during the mission can include persistent data that are produced during the mission and that are usable during further missions. In addition to storing the software for causing the robot 100 to perform its behaviors, the memory 126 can store data resulting from processing of the sensor data for access by the controller 111. For example, the map can be a map that is usable and updateable by the controller 111 of the robot 100 from one mission to another mission to navigate the robot 100 about the floor surface 50.

The persistent data, including the persistent map, can help to enable the robot 100 to efficiently clean the floor surface 50. For example, the map can enable the controller 111 to direct the robot 100 toward open floor space and to avoid nontraversable space. In addition, for subsequent missions, the controller 111 can use the map to optimize paths taken during the missions to help plan navigation of the robot 100 through the environment 40.

The controller 111 can also send commands to a motor (internal to the body 102) to drive the arms 106 to move the pad assembly 108 between the stored position (shown in FIGS. 2A and 2D) and the deployed position (shown in FIGS. 2C and 2E). In the deployed position, the pad assembly 108 (the mopping pad 142) can be used to mop a floor surface of any room of the environment 40.

The mopping pad 142 can be a dry pad or a wet pad. Optionally, when the mopping pad 142 is a wet pad, the pump 134 can be operated by the controller 111 to spray or drop fluid (e.g., water or a cleaning solution) onto the floor surface 50 or the mopping pad 142. The wetted mopping pad 142 can then be used by the robot 100 to perform wet mopping operations on the floor surface 50 of the environment 40. As discussed in further detail below, the controller 111 can determine when to move the pad tray 141 and the mopping pad 142 between the stored position and the cleaning position.

The above discussion is intended to provide an overview of subject matter of the present patent application. It is not intended to provide an exclusive or exhaustive explanation of the invention. The description below provides further information about the present patent application. The asymmetric wheel for a mobile cleaning robot will be discussed in further detail below with reference to FIGS. 3-9.

Figure 3:
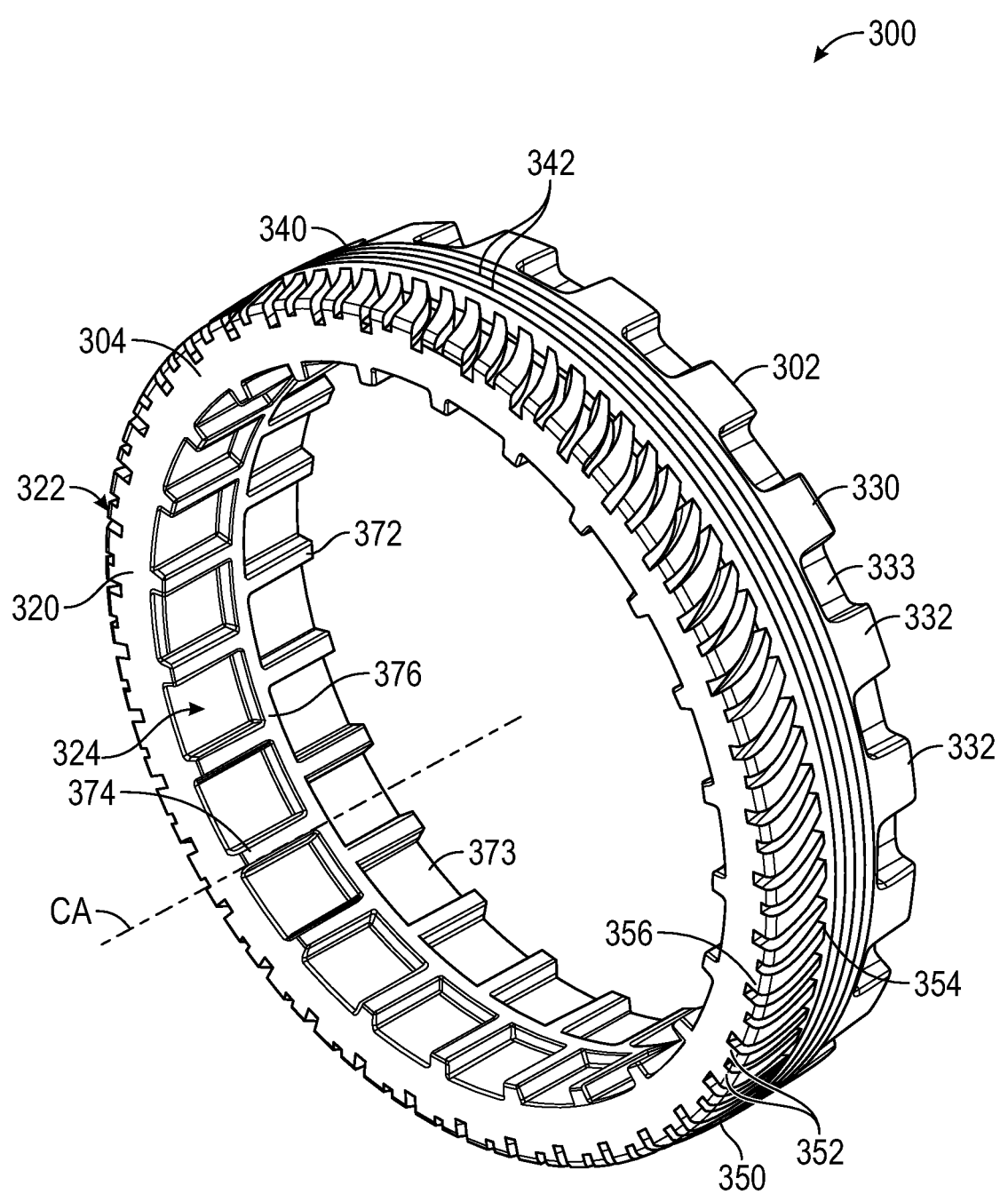
FIG. 3 illustrates an isometric view of an example of a drive wheel for a mobile cleaning robot.
Figure 4:
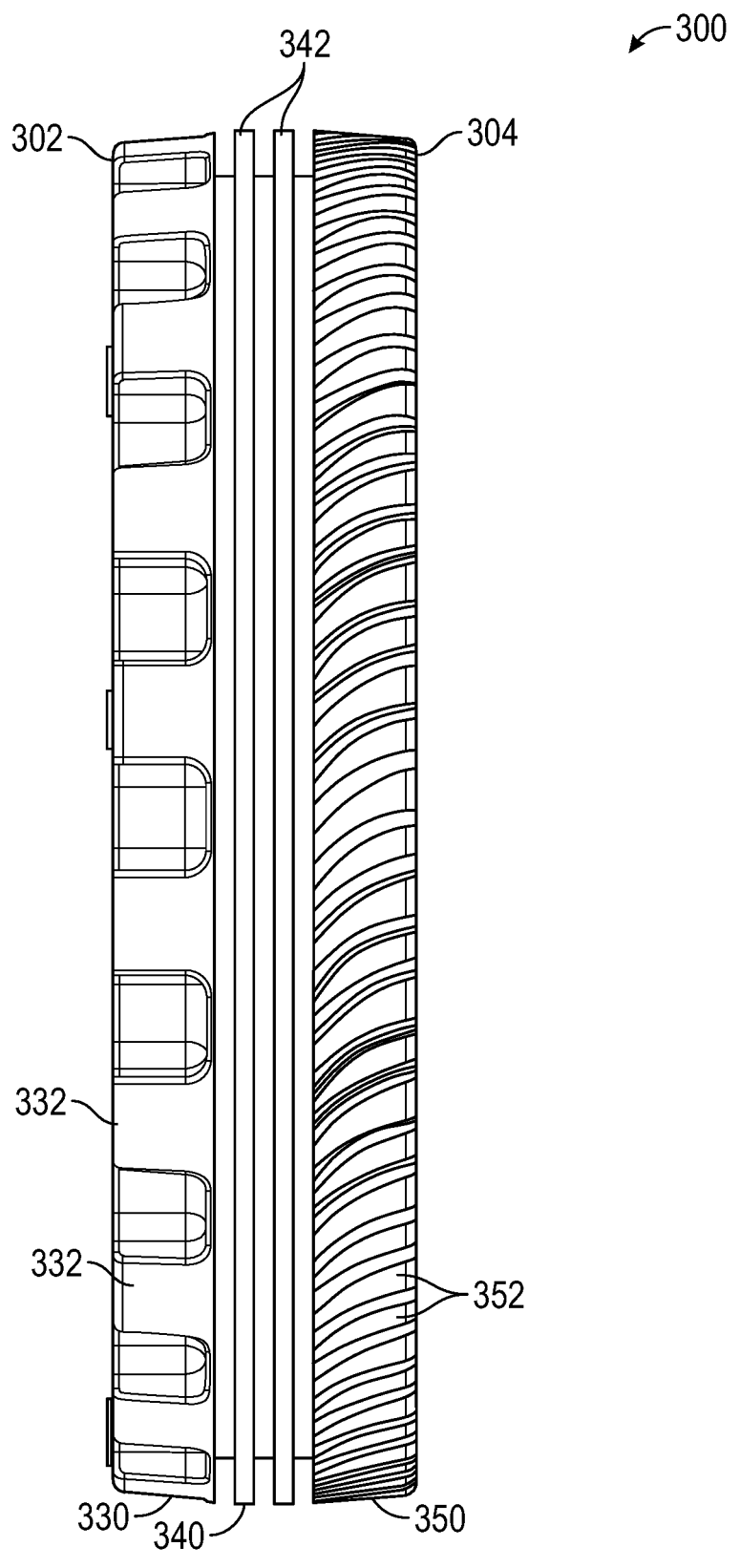
FIG. 4 illustrates a perspective view of an example of a portion of a drive wheel for a mobile cleaning robot.

FIGS. 3 and 4 will be discussed together below. FIG. 3 illustrates an isometric view of an example of a drive wheel 300 for a mobile cleaning robot (e.g., the robot 100 from FIGS. 1-2E). FIG. 4 illustrates a perspective view of a portion of the drive wheel 300 for a mobile cleaning robot. The drive wheel 300 shown in FIGS. 3 and 4 can be configured to be installed on a right side of the robot 100 to provide a forward traveling bias to improve the traction of the robot 100 while traveling forward. Here, a mirrored example of the drive wheel 300 can be installed on the left side of the robot 100 to also provide a forward traveling bias to improve the traction of the robot 100 while traveling forward. In another example, the drive wheel 300 can be configured to be installed on a left side of the robot 100 to provide a reverse traveling bias to improve the traction of the robot 100 while traveling in reverse. Here, a mirrored example of the drive wheel 300 can be installed on the right side of the robot 100 to also provide a reverse traveling bias to improve the traction of the robot 100 while traveling in reverse.

The drive wheel 300 can extend circumferentially around a central axis CA. The drive wheel 300 can be configured to have multiple tread sections. Each of the multiple tread sections can have different characteristics to help the mobile cleaning robot navigate obstacles during operation. For example, the drive wheel 300 can include a tread section to help the mobile cleaning robot climb or traverse obstacles. The drive wheel 300 can include a tread section to maintain contact with the surface of the floor to reduce noise and improve traction. The drive wheel 300 can also include a tread section to direct water away from the other tread sections and direct water toward the middle of the mobile cleaning robot.

In an example, the drive wheel 300 can include a first wall 302, a second wall 304, a tread base 320, a first treaded surface 322, and a second treaded surface 324. The first wall 302 can define a first sidewall of the drive wheel 300. The second wall 304 can define a second sidewall of the drive wheel 300. The second wall 304 can be laterally spaced from the first wall 302. In examples, the drive wheel 300 can include treads that span from the first wall 302 to the second wall 304. The lateral spacing between the first wall 302 and the second wall 304 can define a total tread width of the drive wheel 300. The first wall 302 and the second wall 304 can together define a height of the drive wheel 300.

The tread base 320 can provide support for the drive wheel 300. The tread base 320 can extend from the first wall 302 to the second wall 304. In examples, the tread base 320 can be configured (e.g., sized or shaped) to alter physical characteristics of the drive wheel 300. For example, to increase a stiffness of the drive wheel 300, the tread base 320 can have an increased thickness. In contrast, the stiffness of the drive wheel 300 can be decreased by decreasing the thickness of the tread base 320. In such examples, the changes in stiffness of the tire can be localized laterally across the drive wheel 300, localized circumferentially around the drive wheel 300, or globalized across the entire surface of the drive wheel 300. Moreover, the tread base 320 can be made from different materials that can alter the physical characteristics of the drive wheel 300. For example, the tread base 320 can be made from different rubbers, polymers, metals, combinations thereof, or the like, such as to help provide variations in physical characteristics of the drive wheel 300.

The first treaded surface 322 can be formed on the tread base 320 to extend radially therefrom and can extend laterally from the first wall 302 to the second wall 304. The first treaded surface 322 can include a first tread section 330, a second tread section 340, and a third tread section 350.

The first tread section 330 can help the mobile cleaning robot climb obstacles. In an example, the first tread section 330 can be adjacent to or near the first wall 302 and can laterally extend toward the second wall 304. The first tread section 330 can also include climbing treads 332. The climbing treads 332 can extend laterally from the first wall 302 towards the second wall 304. The climbing treads 332 can also extend radially from the tread base 320. Each climbing tread of the climbing treads 332 can be circumferentially spaced from each adjacent climbing tread by a groove 333. In examples, the groove 333 can extend radially inward from the first treaded surface 322 and extend circumferentially around the drive wheel 300.

The second tread section 340 can help the mobile cleaning robot maintain traction and can help to reduce noise generated by the drive wheels when traversing a flooring surface or obstacle. The second tread section 340 can laterally extend from the first tread section 330 toward the second wall 304. The second tread section 340 can include continuous treads 342. The continuous treads 342 can extend circumferentially and can extend continuously around the drive wheel 300. The continuous treads 342 can also extend radially from the tread base 320. Each continuous tread of the continuous treads 342 can be laterally spaced from each adjacent continuous tread.

The third tread section 350 can help remove water from underneath the drive wheel 300 and can direct water towards a center of the mobile cleaning robot as the drive wheel 300 rotates during operation. The third tread section 350 can laterally extend between the second tread section 340 and the second wall 304. The third tread section 350 can include curved treads 352. The curved treads 352 can extend laterally and arcuately from a first edge 354 to a second edge 356. The first edge 354 can be adjacent to or located near the second tread section 340. The second edge 356 can be adjacent to or near the second wall 304. The curved treads 352 can also extend radially from the tread base 320.

Each of the curved treads 352 can have a circumferential length defined by the first edge 354 and the second edge 356. As the first edge curved treads 352 extends from the first edge 354 to the second edge 356, the circumferential length of the curved treads 352 can vary. For example, the circumferential length of the curved treads 352 can be greater at the first edge 354 than at the second edge 356. In another example, the circumferential length of the curved treads 352 can be greater at the second edge 356 than the first edge 354. Each of the curved treads 352 can have multiple radii of curvature. For example, each of the curved treads 352 can extend along one, two, three, or four radii of curvature. For example, each of the curved treads 352 can extend from the first edge 354 at a first radius of curvature, extend toward the second edge 356 at a second radius of curvature, then extend toward the second edge 356 at a third radius of curvature, and extend to the second edge 356 at a fourth radius of curvature.

As shown in FIG. 3, the drive wheel 300 can also include a second treaded surface 324 formed on the tread base 320 that can be moved to a radially outer position to function as the treaded surface that engages the flooring surface. The second treaded surface 324 can be formed on the tread base 320 opposite the first treaded surface 322. The second treaded surface 324 can extend from the first wall 302 to the second wall 304. The second treaded surface 324 can be radially spaced from the first treaded surface 322.

The second treaded surface 324 can be configured to help the mobile cleaning robot climb obstacles during the operation of the mobile cleaning robot. The second treaded surface 324 can include a first set of treads 372, a second set of treads 374, and a ridge 376.

The first set of treads 372 can extend laterally from the first wall 302. The first set of treads 372 can extend circumferentially and radially from the tread base 320. Each tread of the first set of treads 372 can be circumferentially spaced from each adjacent tread of the first set of treads. In examples, the circumferential spacing between adjacent treads can be defined by grooves 373.

The second set of treads 374 can extend laterally from the second wall 304 and can extend circumferentially around the drive wheel 300. The treads 374 can also extend radially from the tread base 320. Each tread of the second set of treads 374 can be circumferentially spaced from each adjacent tread of the second set of treads 374. In an example, the second set of treads 374 can be circumferentially spaced from the first set of treads 372.

The ridge 376 can be located between the first set of treads 372 and the second set of treads 374 and can connect the first set of treads 372 and the second set of treads 374. The ridge 376 can extend circumferentially around the second treaded surface 324. The ridge 376 can also extend laterally and radially from the tread base 320 between the first set of treads 372 and the second set of treads 374. The treads 372, the treads 374, and the ridge 376 can be configured to optimize climbing mobile cleaning robot such that the drive wheel 300 can traverse obstacles on the floor.

Figures 5, 6:
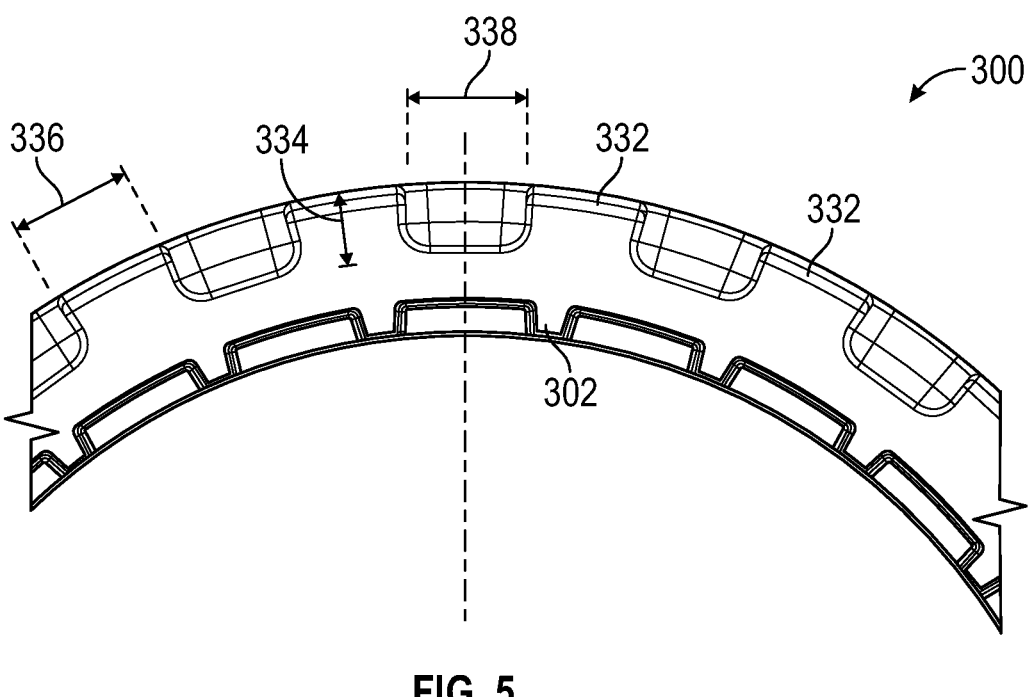
FIG. 5 illustrates a side view of an example of a drive wheel for a mobile cleaning robot.
FIG. 6 illustrates an enlarged view of a surface of a drive wheel for a mobile cleaning robot.

FIG. 5 illustrates a side view of an example of a drive wheel (e.g., the drive wheel 300) for a mobile cleaning robot (e.g., the robot 100 from FIGS. 1-2E).

The climbing treads 332 can help the mobile cleaning robot traverse obstacles on the surface of the floor. The climbing treads 332 can include a height 334. The height 334 can be a radial distance between the tread base 320 and a periphery or radially outer surface of the climbing treads 332. The height 334 can determine an amount of the drive wheel 300 that can engage with obstacles. Thus, increasing the height 334, can increase the surface area of the climbing treads 332, which can help the drive wheel 300 engage with obstacles and more carpet fibers. However, the higher the height 334, the less stiff the climbing treads 332. Thus, the height 334 can be optimized to increase climbing and maintain stiffness of the drive wheel 300 such as to optimize performance of the treads 332 when traversing obstacles. In examples, the height 334 of the climbing treads 332 can be between 2.0 mm and 3.0 mm. In another example, the height 334 of the climbing treads 332 can be between 1.0 mm and 3.5 mm. In yet another example, the height 334 can be between 0.5 mm and 6 mm.

The climbing treads 332 can also include a circumferential length (length 336). The length 336 can be a circumferential distance along the surface of the climbing treads 332. The length 336 can determine an amount of the climbing treads 332 at the height 334. Thus, the length 336 can be adjusted to change the climbing ability of the drive wheel 300. For example, the greater the length 336, the greater the surface area of each tread 332 at a maximum diameter of the tire. However, the greater the length 336, the less spacing will be available between the climbing treads 332. Thus, the length 336 can be adjusted to help optimize traction. In an example, the length 336 of the climbing treads 332 can be between 4.5 mm and 6.5 mm. In another example, the length 336 of the climbing treads 332 can be between 3.0 mm and 7.0 mm. In yet another example, the length 336 of the climbing treads 332 can be between 2.5 mm and 7.5 mm.

The climbing treads 332 can also include a circumferential space 338. The circumferential space 338 can be a circumferential distance between each adjacent tread of the climbing treads 332. The circumferential space 338 can be at least partially defined by the void and can help to absorb forces delivered to the drive wheel 300 by obstacles, and can help to increase a surface area of the drive wheel 300.

The larger the circumferential space 338, the larger the void between treads of the climbing treads 332. However, the increasing the circumferential space 338, can reduce a quantity of treads that can be circumferentially placed around the drive wheel 300 and can reduce friction or grab of drive wheel 300 on obstacles. Additionally, increasing circumferential space 338 can reduce the life cycle of the drive wheel 300 because there is less rubber on the drive wheel 300. Thus, the circumferential space 338 can be adjusted to optimize voids and performance of the drive wheel 300. In an example, the circumferential space 338 can be between 4.5 mm and 6.5 mm. In another example, the circumferential space 338 of the climbing treads 332 can be between 3.0 mm and 7.0 mm. In yet another example, the circumferential space 338 of the climbing treads 332 can be between 2.5 mm and 7.5 mm.

FIG. 6 illustrates an enlarged view of the drive wheel 300 for a mobile cleaning robot (e.g., the robot 100 from FIGS. 1-2E).

The second tread section 340 can include continuous treads 342. The continuous treads 342 can help the drive wheel 300 maintain traction with the environment as the drive wheel 300 moves the robot (e.g., the robot 100 from FIGS. 1-2E) around an environment. The continuous traction can help reduce noise of the drive wheel during traversing of flooring surfaces and can help to reduce slippage between the drive wheel 300 and flooring surface or obstacles in the environment. The reduced slippage can help improve predictability in movement of the robot around the environment. The continuous treads 342 can extend circumferentially continuously around the drive wheel 300. The continuous treads 342 can also extend radially from the tread base 320. Each continuous tread of the continuous treads 342 can be laterally spaced from each adjacent continuous tread. For example, the continuous treads 342 can be spaced between 0.5 mm and 2.5 mm.

In an example, the continuous treads 342 can include a width 344 between 0.5 mm and 2.5 mm. Thus, the drive wheel 300 can include a ratio between the length 336 and the width 344 between 2 and 9. The ratio between the length 336 and the height 334 ensures enough space to let water and other debris escape the drive wheel 300 while maintaining a needed stiffness for the climbing treads 332 and the continuous treads 342.

A depth 346 of the continuous treads 342 can help maintain stiffness in the continuous treads 342 while permitting water and other obstacles to escape the drive wheel 300 so that the continuous treads 342 can maintain contact with a surface during operation. Thus, the depth 346 of the continuous treads 342 can be alter performance of the mobile cleaning robot. In an example, the depth 346 of the continuous treads 342 can be between 1.75 mm and 2.75 mm. In another example, the depth 346 of the continuous treads 342 can be between 1.5 mm and 3.0 mm. In yet another example, the depth 346 of the continuous treads 342 can be between 1.0 and 4.75 mm.

As shown in FIG. 6, the first tread section 330 can have a first section width 331, the second tread section 340 can have a second section width 341, and the third tread section 350 can have a third section width 351. In the example shown in FIG. 6, the first section width 331, the second section width 341, and the third section width 351 are equal. In another example, any of the first section width 331, the second section width 341, or the third section width 351, can be larger than any other of the first section width 331, the second section width 341, or the third section width 351. For example, the first section width 331 can be 10-50% a total width of the first treaded surface 322, the second section width 341 can be 10-50% the total width of the first treaded surface 322, and the third section width 351 can be 10-50% the total width of the first treaded surface 322.

Figure 7:
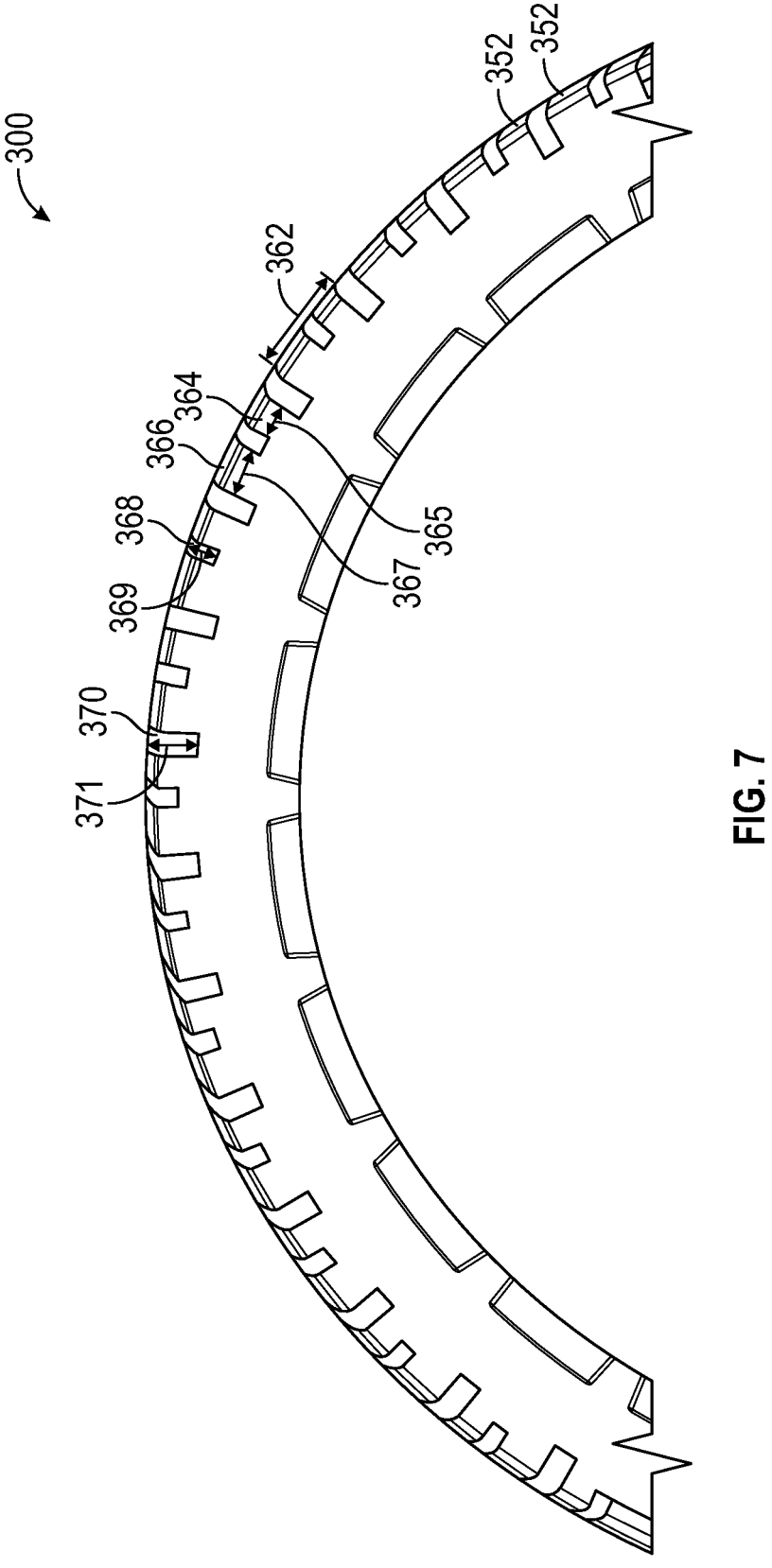
FIG. 7 illustrates another side view of an example of a drive wheel for a mobile cleaning robot.

FIG. 7 illustrates another side view of the drive wheel 300 for a mobile cleaning robot (e.g., the robot 100 from FIGS. 1-2E).

The third tread section 350 can include a plurality of nub sets (nub sets 362). Each nub set of the nub sets 362 can include a first curved nub 364 and a second curved nub 366. The first curved nub 364 can extend radially from the tread base 320 and can extend laterally from the first wall 302 toward the second wall 304. The second curved nub 366 can extend radially from the tread base 320 and can extend laterally from the second wall 304 toward the first wall 302. Each of the first curved nub 364 can be circumferentially spaced from each of the second curved nub 366 forming a first groove 368 therebetween. Each nub set 362 can be spaced apart from each adjacent nub set 362, forming a second groove 370 therebetween.

The first groove 368 can include a first groove depth 369. The first groove depth 369 can be adjusted to adjust a volume of water that can be directed through the first groove 368. For example, the greater the first groove depth 369, the more water can be directed from under the drive wheel 300 towards the center of the mobile cleaning robot. However, the deeper the first groove depth 369, the less stiff the drive wheel 300. Thus, the depth of the first groove depth 369 can be optimized for the performance of the mobile cleaning robot. For example, the first groove depth 369 can be between 1.0 mm and 2.0 mm. In another example, the first groove depth 369 can be between 0.75 mm and 2.5 mm. In yet another example, the first groove depth 369 can be between 0.5 mm and 3.5 mm.

The second groove 370 can include a second groove depth 371. The second groove depth 371 can be adjusted to alter a volume of water directed through the second groove 370. For example, increasing the second groove depth 371 can increase an amount of water that can be directed from under the drive wheel 300 towards the center of the mobile cleaning robot. However, the deeper the second groove depth 371, the less stiff the drive wheel 300. Thus, the depth of the second groove depth 371 can be altered to improve the performance of the mobile cleaning robot. For example, the second groove depth 371 can be between 1.75 mm and 2.75 mm. In another example, the second groove depth 371 can be between 1.5 mm and 3.0 mm. In yet another example, the second groove depth 371 can be between 1.0 mm and 3.5 mm.

In an example, a ratio of first groove depth 369 and the second groove depth 371 can be between 1.4 and 1.8, such as to control the volume of water directed from under the drive wheel 300 while maintaining an effective stiffness of the drive wheel 300. In an example, the first groove depth 369 can be higher than the second groove depth 371.

In examples, the first curved nub 364 can include a first curved nub width 365. The second curved nub 366 can include a second curved nub width 367. The first curved nub width 365 and the second curved nub width 367 can be adjusted to traction of the drive wheel 300 during the operation of the mobile cleaning robot. However, increasing the first curved nub width 365 and the second curved nub width 367, reduces space available around the drive wheel 300 for the first groove 368 and the second groove 370. Because of the less space for the first groove 368 and the second groove 370, there can be a decreased capacity to direct water from under the drive wheel 300 toward or away from the center of the robot as the first curved nub width 365 and the second curved nub width 367 are increased. Thus, the first curved nub width 365 and the second curved nub width 367 can be optimized to improve the performance of the mobile cleaning robot. For example, a ratio between the second curved nub width 367 and the first curved nub width 365 can be between 1 and 1.5.

Figure 8:
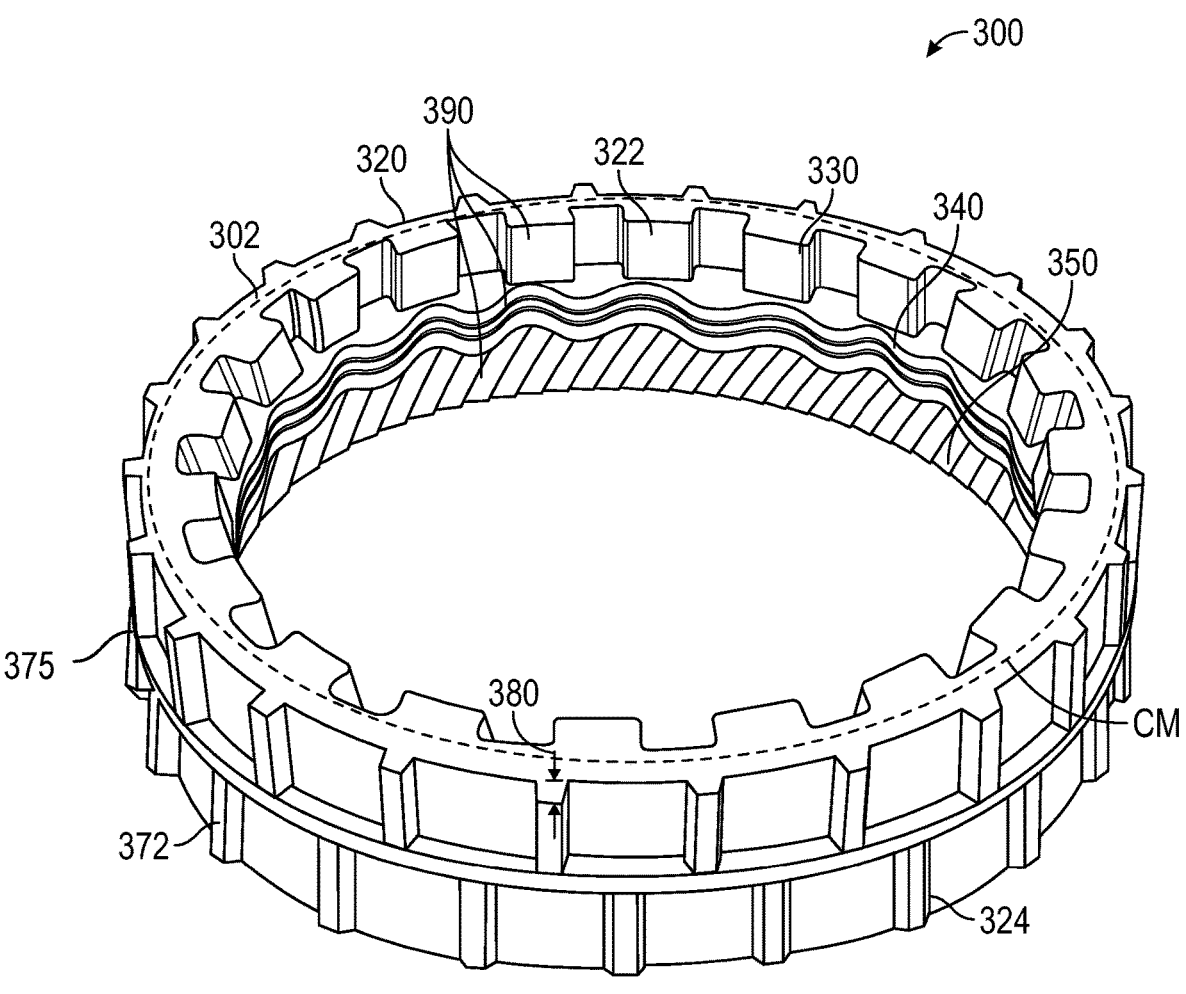
FIG. 8 illustrates a perspective view of an example of a drive wheel for a mobile cleaning robot.

FIG. 8 illustrates a perspective view of an example of the drive wheel 300 for a mobile cleaning robot (e.g., the robot 100 from FIGS. 1-2E).

In an example, the drive wheel 300 can include a first treaded surface 322 formed on the tread base 320. The drive wheel 300 can also include a second treaded surface 324 formed on the tread base 320 opposite the first treaded surface 322, the second treaded surface 324 can extend from the first wall 302 to the second wall 304, and the second treaded surface 324 radially spaced from the first treaded surface 322. The first tread section 330, the second tread section 340, and the third tread section 350.

In an example, the second treaded surface 324 can also include a first set of treads 372 that can extend laterally from the first wall 302, extend circumferentially, and extend radially from the tread base 320. Each tread of the first set of treads can be circumferentially spaced from each adjacent tread on the second treaded surface 324. In an example, the second treaded surface 324 can also include a second set of treads 374 that can extend laterally from the second wall 304, extend circumferentially, and extend radially from the tread base 320. Each tread of the second set of treads can be circumferentially spaced from each adjacent tread on the second treaded surface 324. In an example, the first set of treads 372 and the second set of treads 374 can include a height 380 from the tread base 320 between 0.75 mm and 2.25 mm.

In an example, the second treaded surface 324 can include a single tread set 375. The single tread set 375 can be optimized to increase the capabilities of the mobile cleaning robot in an environment. For example, the single tread set 375 can be optimized to improve climbing by having climbing treads, optimized to improve traction in wet environments by having curved treads, or optimized to reduce noise and improve traction by having continuous treads. As discussed above, the first treaded surface 322 can include multiple treads (e.g., multiple tread sets 390) to improve the overall performance of the mobile cleaning robot. The first treaded surface 322 and the second treaded surface 324 can be configured to alternate between a radially outward position and a radially inward position by rotating the drive wheel 300 about a circumferential midline CM of the tread base 320. Therefore, the drive wheel 300 can be adjusted between the first treaded surface 322, which can be good for a variety of conditions, or the second treaded surface 324, which can be optimized for a specific environment.

The first treaded surface 322 and the second treaded surface 324 are designed to be in their desired configuration at the most radially outward diameter. Thus, deformation can occur when either of the first treaded surface 322 or the second treaded surface 324 are in the radially inward position. For example, as shown in FIG. 8, the second treaded surface 324 can be radially outside the first treaded surface 322. As such, when the first treaded surface 322 is radially inward the second treaded surface 324, the first treaded surface 322 can be deformed because the diameter of the radially inward surface is less than the radially outward surface.

Figure 9:
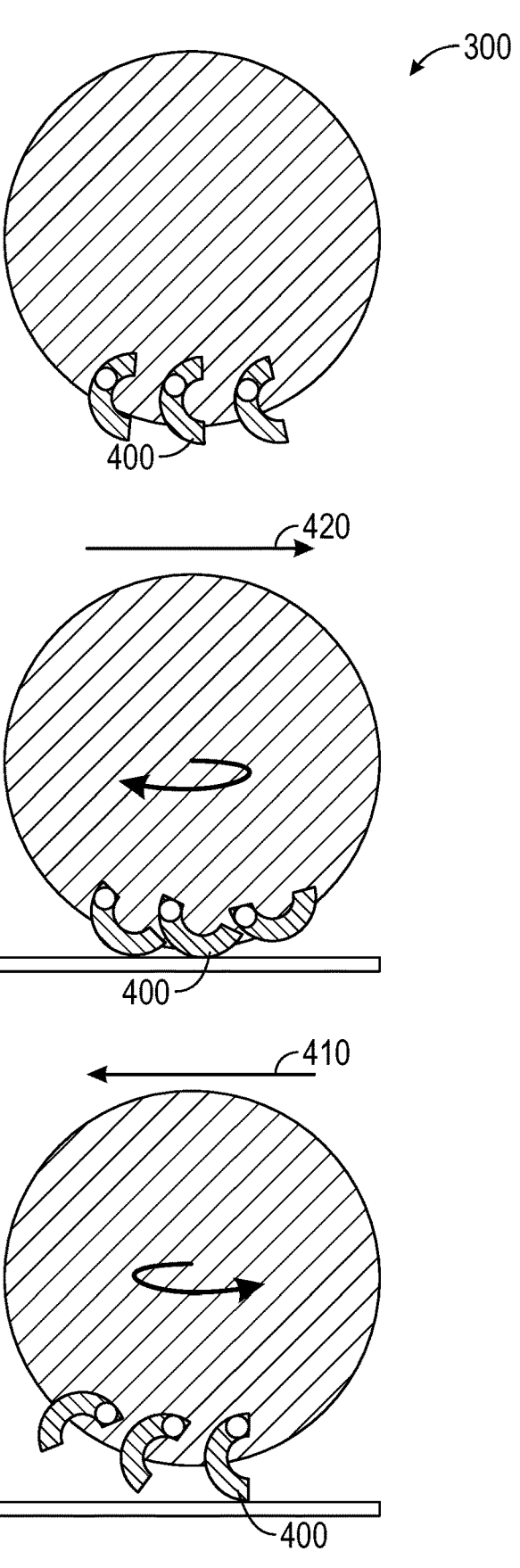
FIG. 9 illustrates a schematic diagram of an example of a drive wheel for a mobile cleaning robot.

FIG. 9 illustrates a schematic diagram of an example of a drive wheel 300 for a mobile cleaning robot (e.g., the robot 100). The example of the drive wheel 300 is a directional wheel that has different performances while traveling in different directions (e.g., forward vs. backward).

In an example, the drive wheel 300 can include a plurality of curved members (curved members 400). The curved members 400 can be pivotably attached to the drive wheel 300 such that the curved members 400 can extend outside a periphery of the drive wheel 300 when the drive wheel moves in a first direction 410 and the curved members 400 can retract toward the periphery of the drive wheel 300 when the drive wheel moves in a second direction 420. In examples, each of the curved members 400 can be preloaded to help maintain the curved members 400 in a retracted position. In an example, the first direction can be counterclockwise. The second direction can be clockwise.

The curved members 400 can rotate outward to add additional traction to the drive wheel 300 when movements that require additional traction are applied (e.g., when moving forward or backward). Moreover, the curved members 400 can rotate inward to reduce additional traction of the drive wheel 300 when movements don't require additional traction (e.g., when moving forward or backward). The reduced traction can reduce the energy required to rotate the drive wheel 300 and can improve the battery life of the mobile cleaning robot.

In examples, the curved members 400 can alter a physical size (e.g., diameter) of the drive wheel 300. For example, the drive wheel 300 can have a smaller diameter when the curved members 400 are retracted and the drive wheel 300 can have a larger diameter when the curved members 400 are extended.

ADDITIONAL NOTES & EXAMPLES

Example 1 is a drive wheel for a mobile cleaning robot, the drive wheel extending circumferentially around a central axis, the drive wheel comprising: a first wall laterally spaced from a second wall; a tread base extending between the first wall and the second wall; a first tread section adjacent to the first wall, the first tread section comprising: climbing treads extending laterally from the first wall towards the second wall and extending radially from the tread base, each climbing tread of the climbing treads circumferentially spaced from each adjacent climbing tread; a second tread section extending from the first tread section toward the second wall, the second tread section comprising: continuous treads extending circumferentially continuously around the drive wheel and extending radially from the tread base, each continuous tread of the continuous treads laterally spaced from each adjacent continuous tread; and a third tread section extending between the second tread section and the second wall, the third tread section comprising: curved treads extending laterally and arcuately from a first edge adjacent to the second tread section to a second edge adjacent to the second wall, the curved treads extending radially from the tread base.

In Example 2, the subject matter of Example 1 includes, wherein the climbing treads comprise a first width and the continuous treads comprise a second width, and wherein a ratio between the first width and the second width is between two and nine.

In Example 3, the subject matter of Example 2 includes, wherein the first width of the climbing treads is between four and a half mm and six and a half mm.

In Example 4, the subject matter of Examples 2-3 includes, wherein the second width of the continuous treads is between half an mm and two and a half mm.

In Example 5, the subject matter of Example 4 includes, wherein a depth of the continuous treads is between one and three-quarters mm and two and three-quarters mm.

In Example 6, the subject matter of Examples 1-5 includes, wherein the climbing treads extend radially from the tread base between two mm and three mm.

In Example 7, the subject matter of Examples 1-6 includes, wherein the curved treads comprise a first curved tread set and a second curved tread set.

In Example 8, the subject matter of Example 7 includes, wherein the first curved tread set comprises a first groove depth and the second curved tread set comprises a second groove depth, and wherein a ratio between the first groove depth and the second groove depth is between one and four tenths and one and eight tenths.

In Example 9, the subject matter of Example 8 includes, wherein a depth of the first groove of the first curved tread set is between one mm and two mm.

In Example 10, the subject matter of Examples 8-9 includes, wherein a depth of the second groove of the second curved tread set is between one and three quarters mm and two and three quarters mm.

In Example 11, the subject matter of Examples 7-10 includes, wherein the first curved tread comprises a first curved tread width and the second curved tread comprises a second curved tread width, and wherein a ratio between the second curved tread width and the first curved tread width is between one and one and a half.

In Example 12, the subject matter of Examples 1-11 includes, a first treaded surface formed on the tread base, the first treaded surface including the first tread section, the second tread section, and the third tread section; and a second treaded surface formed on the tread base opposite the first treaded surface, the second treaded surface extending from the first wall to the second wall, and the second treaded surface radially spaced from the first treaded surface.

In Example 13, the subject matter of Example 12 includes, wherein the second treaded surface comprises: a first set of treads extending laterally from the first wall, extending circumferentially, and extending radially from the tread base, each tread of the first set of treads circumferentially spaced from each adjacent tread on the second treaded surface.

In Example 14, the subject matter of Example 13 includes, wherein the second treaded surface also comprises: a second set of treads extending laterally from the second wall, extending circumferentially, and extending radially from the tread base, each tread of the second set of treads circumferentially spaced from each adjacent tread on the second treaded surface.

In Example 15, the subject matter of Example 14 includes, wherein the second set of treads are circumferentially spaced from the first set of treads.

In Example 16, the subject matter of Example 15 includes, wherein the second treaded surface also comprises: a ridge extending circumferentially around the second treaded surface, extending laterally, and extending radially from the tread base between the first set of treads and the second set of treads.

In Example 17, the subject matter of Examples 14-16 includes, wherein the first set of treads and the second set of treads comprise a height from the tread base between three quarters mm and two and one quarter mm.

In Example 18, the subject matter of Example 17 includes, wherein the first treaded surface and the second treaded surface are configured to alternate between a radially outward position and a radially inward position by rotating the drive wheel about a circumferential midline of the tread base.

In Example 19, the subject matter of Examples 1-18 includes, a plurality of curved members pivotably attached to the drive wheel that the plurality of curved members extends outside a periphery of the drive wheel when the drive wheel moves in a first direction and the plurality of curved members retracts toward the periphery of the drive wheel when the drive wheel moves in a second direction.

In Example 20, the subject matter of Example 19 includes, wherein the first direction is counterclockwise, and wherein the second direction is clockwise.

Example 21 is a drive wheel for a mobile cleaning robot, the drive wheel extending circumferentially around a central axis, the drive wheel comprising: a first wall laterally spaced from a second wall; a tread base extending between the first wall and the second wall; a first treaded surface formed on the tread base, the first treaded surface including multiple tread sets; and a second treaded surface formed on the tread base opposite the first treaded surface, the second treaded surface extending from the first wall to the second wall, and the second treaded surface radially spaced from the first treaded surface, the second treaded surface including a single tread set, the single tread set can be optimized to increase capabilities of the mobile cleaning robot in an environment.

In Example 22, the subject matter of Example 21 includes, wherein the first treaded surface and the second treaded surface are configured to alternate between a radially outward position and a radially inward position by rotating the drive wheel about a circumferential midline of the tread base.

In Example 23, the subject matter of Example 22 includes, wherein the first treaded surface comprises: climbing treads extending laterally from the first wall towards the second wall and extending radially from the tread base, each climbing tread of the climbing treads circumferentially spaced from each adjacent climbing tread; continuous treads extending circumferentially continuously around the drive wheel and extending radially from the tread base, each continuous tread of the continuous treads laterally spaced from each adjacent continuous tread; and curved treads extending laterally and arcuately from a first edge adjacent to the continuous treads to a second edge adjacent to the second wall, the curved treads extending radially from the tread base; wherein: the climbing treads are configured to help the mobile cleaning robot navigate obstacles; the continuous treads are configured to maintain contact with a surface of a floor and reduce noise of operation of the mobile cleaning robot; and the curved treads are configured to remove water from under the drive wheel and direct the water towards a center of the mobile cleaning robot.

In Example 24, the subject matter of Example 23 includes, wherein the single tread set of the second treaded surface is configured to optimize for navigating obstacles, and wherein the single tread set comprises: a first plurality of nubs extending laterally from the first wall towards the second wall and circumferentially around the drive wheel; a second plurality of nubs extending laterally from the second wall towards the first wall and circumferentially around the drive wheel; and a ridge extending circumferentially around the drive wheel between the first plurality of nubs and the second plurality of nubs.

In Example 25, the subject matter of Examples 23-24 includes, wherein the single tread set of the second treaded surface is configured to optimize for navigating wet environments, and wherein the single tread set comprises: a plurality of curved nub sets, wherein each curved nub set of the plurality of curved nub sets comprises: a first curved nub extending radially from the tread base and laterally from the first wall to the second wall; and a second curved nub extending radially from the tread base and laterally and arcuately from the first wall to the second wall; wherein: the first curved nub and the second curved nub are circumferentially spaced from one another forming a first groove therebetween; each curved nub set of the plurality of curved nub sets are circumferentially spaced from each adjacent curved nub set forming a second groove therebetween adjacent curved nub sets; and the first groove having a first groove height greater than a second groove height of the second groove.

Example 26 is an autonomous mobile cleaning robot comprising: a cleaning assembly configured to lift debris from a surface and direct the debris into a dustpan; and a drive wheel configured to move the autonomous mobile cleaning robot on the surface, the drive wheel comprising a first set of treads configured to climb an obstacle, a second set of treads configured to maintain continuous contact with a surface of a floor, and third set of treads configured to direct water underneath the third set of treads towards a center of the autonomous mobile cleaning robot.

In Example 27, the subject matter of Example 26 includes, wherein the first set of treads comprises: climbing treads extending laterally from a first wall and radially from a surface of the drive wheel, each climbing tread of the climbing treads circumferentially spaced from each adjacent climbing tread.

In Example 28, the subject matter of Example 27 includes, wherein the second set of treads comprises: continuous treads extending circumferentially around the drive wheel and extending radially from the surface of the drive wheel, each continuous tread of the continuous treads laterally spaced from each adjacent continuous tread.

In Example 29, the subject matter of Example 28 includes, wherein the third set of treads comprises: curved treads extending laterally and arcuately from a first edge adjacent to the second tread set to a second edge adjacent to a second wall, the curved treads extending radially from the surface of the drive wheel.

In Example 30, the subject matter of Example 29 includes, wherein the drive wheel is installed on the autonomous mobile cleaning robot such that the third tread faces a middle of the autonomous mobile cleaning robot and the first tread faces a periphery of the autonomous mobile cleaning robot.

Example 31 is an apparatus comprising means to implement of any of Examples 1-30.

Example 32 is a system to implement of any of Examples 1-30.

Example 33 is a method to implement of any of Examples 1-30.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A drive wheel for a mobile cleaning robot, the drive wheel extending circumferentially around a central axis, the drive wheel comprising:
 a first wall laterally spaced from a second wall;
 a tread base extending between the first wall and the second wall;
 a first tread section adjacent to the first wall, the first tread section comprising:
  climbing treads extending laterally from the first wall towards the second wall and extending radially from the tread base, each climbing tread of the climbing treads including a circumferential length, each climbing tread of the climbing treads circumferentially spaced from each adjacent climbing tread by a distance substantially equal to the circumferential length;
 a second tread section extending from the first tread section toward the second wall, the second tread section comprising:
  continuous treads extending circumferentially continuously around the drive wheel and extending radially from the tread base, each continuous tread of the continuous treads laterally spaced from each adjacent continuous tread; and a third tread section extending between the second tread section and the second wall, the third tread section comprising:
  curved treads extending laterally and arcuately from a first edge adjacent to the second tread section to a second edge adjacent to the second wall, the curved treads extending radially from the tread base.

2. The drive wheel of claim 1, wherein the climbing treads comprise a first width and the continuous treads comprise a second width, and wherein a ratio between the first width and the second width is between 2 and 9.

3. The drive wheel of claim 1, wherein the curved treads comprise a first curved tread set and a second curved tread set.

4. The drive wheel of claim 3, wherein the first curved tread set comprises a first groove depth and the second curved tread set comprises a second groove depth, and wherein a ratio between the first groove depth and the second groove depth is between 1.4 and 1.8.

5. The drive wheel of claim 3, wherein the first curved tread comprises a first curved tread width and the second curved tread comprises a second curved tread width, and wherein a ratio between the second curved tread width and the first curved tread width is between 1 and 1.5.

6. The drive wheel of claim 1, further comprising:
 a first treaded surface formed on the tread base, the first treaded surface including the first tread section, the second tread section, and the third tread section; and
 a second treaded surface formed on the tread base opposite the first treaded surface, the second treaded surface extending from the first wall to the second wall, and the second treaded surface radially spaced from the first treaded surface.

7. The drive wheel of claim 6, wherein the second treaded surface comprises:
 a first set of treads extending laterally from the first wall, extending circumferentially, and extending radially from the tread base, each tread of the first set of treads circumferentially spaced from each adjacent tread on the second treaded surface.

8. The drive wheel of claim 7, wherein the second treaded surface also comprises:
 a second set of treads extending laterally from the second wall, extending circumferentially, and extending radially from the tread base, each tread of the second set of treads circumferentially spaced from each adjacent tread on the second treaded surface.

9. The drive wheel of claim 8, wherein the second treaded surface also comprises:
 a ridge extending circumferentially around the second treaded surface, extending laterally, and extending radially from the tread base between the first set of treads and the second set of treads.

10. The drive wheel of claim 8, wherein the first treaded surface and the second treaded surface are configured to alternate between a radially outward position and a radially inward position by rotating the drive wheel about a circumferential midline of the tread base.

* * * * *